July 21, 1959 W. I. JONES 2,895,199
ALL PLASTIC SEPARABLE FASTENER OF THE PRESS BUTTON TYPE
Filed April 12, 1955 2 Sheets-Sheet 1
FIG. 1.
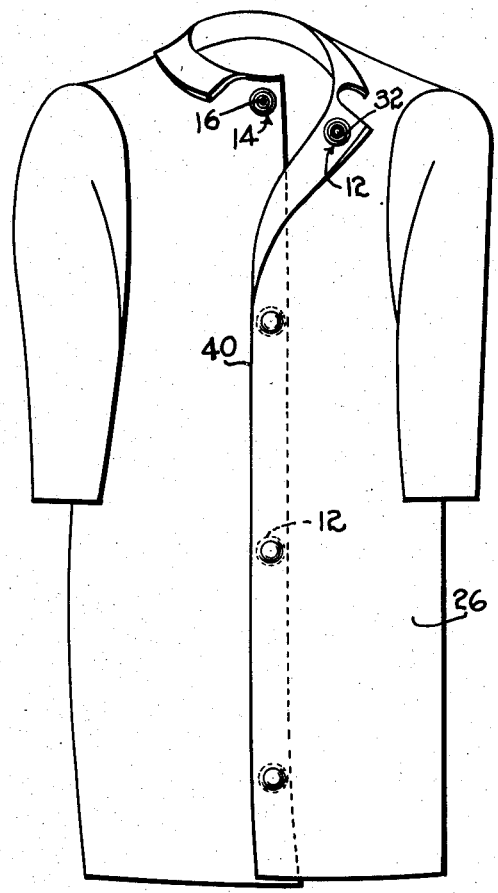
FIG. 2.
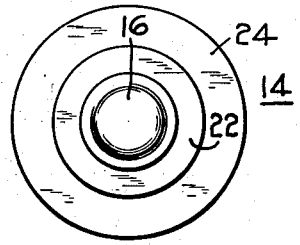
FIG. 3.
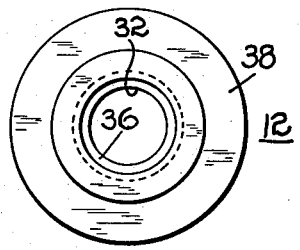
FIG. 4.
FIG. 4a.
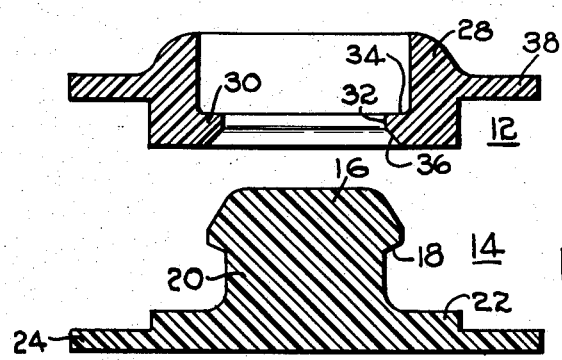
INVENTOR:
WALTER I. JONES,
ATTORNEYS.

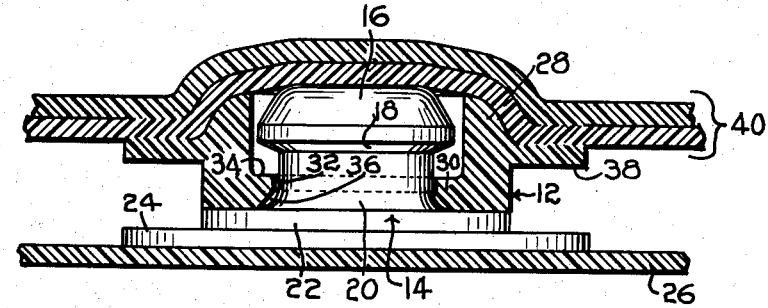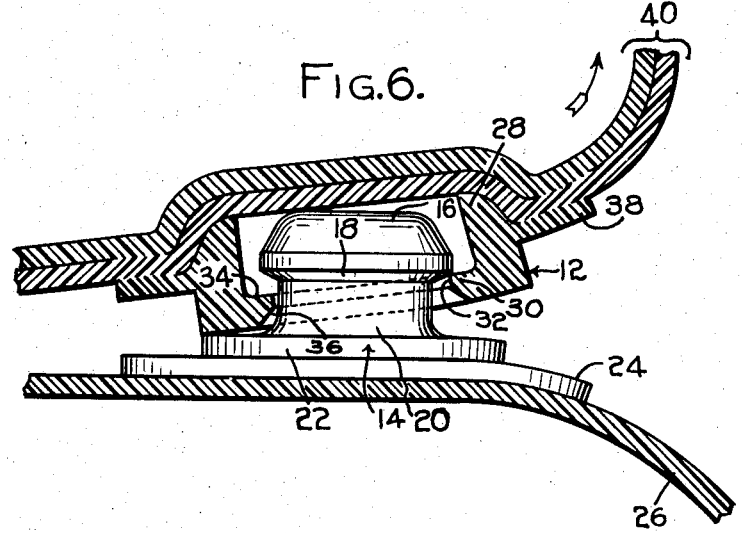

United States Patent Office 2,895,199
Patented July 21, 1959

2,895,199

ALL PLASTIC SEPARABLE FASTENER OF THE PRESS BUTTON TYPE

Walter I. Jones, Belmont, Mass., assignor to United-Carr Fastener Corporation, Cambridge, Mass., a corporation of Delaware Application April 12, 1955, Serial No. 500,866

5 Claims. (Cl. 24—213)

This invention relates to separable fasteners and, more particularly, to snap fasteners of the stud and socket or press button type. By separable fastener is meant one having parts adapted repeatedly to be released from one another and repeatedly to be connected again by simple manual manipulations and without the use of tools. The object of the invention is to provide such a fastener formed from non-metallic polymeric material suitable for use on garments and in its preferred form particularly suitable for attachment to articles of synthetic plastic sheeting, among which may be instanced raincoats, waterproofs head coverings, baby pants and bags or envelopes.

Metallic snap fasteners have long been made comprising male and female parts, a "stud" and "socket," generally of two types. In one type one of the elements carries a separate spring having elasticity of shape which spring, when the two elements are axially assembled, reacts (snaps) to interlock the elements against casual separation, yet permits their separation on an intentional pull. In another type the metal for one or both of the elements is so subdivided and shaped as to provide arms or fingers, each having a resiliency because of its shape, which secure together the parts. The elements were suitably shaped as by inclined or rounded cooperating surfaces to provide for stressing the resilient elements by a camming action resulting from the axial movements of assembly or disassembly.

It has been proposed to utilize in snap fastener constructions elements formed of natural organic materials such as ivory or bone, or of synthetic materials such as artificial horn, for instance casein treated with formaldehyde, or celluloid or cellulose acetate. The parts in such fasteners were thick and massive as compared with those of an ordinary garment fastener. In a popular sense the materials were not only hard but rigid, although technically ivory for example is highly elastic. Where the inherent resiliency of the material was relied on to provide the snap action either the retaining grip was inadequate or the force required, especially that to separate the parts, excessive. It may be noted that an extremely fine dimensional accuracy in the parts of a snap fastener cannot be obtained in commercial manufacture. Therefore it was further proposed to slit one or both of the parts to provide separately yieldable arms but, since the material was brittle, thick sections were required for these arms and a relatively bulky fastener resulted and the arms were subject to relatively easy breakage.

In accordance with my invention I may utilize a suitable synthetic organic plastic (using the word "plastic" in the popular sense) which while firm has substantial elastic compressibility and also is resiliently extensible to permit distortion of shape under a strain such as could be easily applied by the hand in a normal action of unfastening. I form the elements of the fastener as unitary, self-sufficient parts which may be essentially solids of revolution, the means for securing them to the parts to be joined together having no effect on their mutual action, and by suitable design of the parts I may provide for their engagement by a snap action occurring when they are axially pressed together in which the mass compressibility of the material is involved but which, after engagement, are in effect positively locked against release under axial pull, while the elastic extensibility of the material under strain permits their separation under a tipping movement involving a radial pull.

In the preceding paragraph I have said the word "plastic" was used in the popular sense. When it is stated that something is made of plastic, we think of a group of synthetic, organic materials having various properties, some being thermoplastic and some thermosetting. We do not think of steel, which literally is thermoplastic, or of pottery clay, which is thermosetting. Similarly, I shall herein use other words in what I may term their commonsense meaning in view of the subject under discussion, although to a physicist they might have a more generalized application. Thus in the practical field of the art to which the present specification and claims relate we may consider that a piece of piano wire is inextensible under longitudinal strain, that a flat ring of brass a sixty-fourth of an inch thick is not subject to change of shape in its plane by elastic distortion or to change of size in its plane by contraction or dilation.

On the other hand, if we can visibly compress a fastener element between a thumb and finger or with a small pair of pliers it is yielding and compressible, although it might be characterized as firm. If we can scratch it with the thumb nail it is not hard, and if with our fingers we can bend it substantially to a right angle without breaking it is not brittle, but tough. If it returns, perhaps somewhat slowly, to its original shape it is neither flabby nor fictile ("plastic") but resilient. If with our fingers we can stretch a ring out of round to a visible more or less oval form it is distortable and if it returns, perhaps somewhat slowly, to its original form it has elasticity of shape.

The vinyl chloride polymeric material referred to is thermoplastic and has the advantage for the use intended that it lends itself to the practice of so-called electronic heat sealing, which utilizes a high frequency alternating current voltage momentarily to fuse the material by molecular friction caused by the resulting alternating electrostatic field. If the fastener is to be secured to a sheet of similar plastic or an article having a film coating of such plastic the flanges 24 and 36 may be welded thereto in an autogenous joint by such means.

My invention will be well understood by reference to the following description of a preferred illustrative embodiment thereof shown by way of example in the accompanying drawings, wherein:

Fig. 1 is a view of a raincoat having fasteners thereon. The relative size of the fasteners is exaggerated;

Fig. 2 is a plan of the male or stud member as it would appear when viewing the outer side of the underlying flap of the coat;

Fig. 3 is a plan of the female or socket member as it would appear when viewing the inner side of the overlying flap of the coat;

Figs. 4 and 4a are diametrical sections of the socket and stud respectively aligned ready for interengagement on axial approach;

Fig. 5 is a view showing the elements interlocked, the socket appearing in section and the stud in elevation; and Fig. 6 is a similar view showing the elements being separated.

A non-metallic polymeric material which I have successfully used and which is the best material for the purpose now known to me, is a polymer of vinyl chloride (commercially designated by the name Geon) plasticized to provide the compressibility and extensibility desired.

and compounded to provide a Durometer hardness of 95 to give the desired firmness. As a white product was desired titanium dioxide was included as a pigment. Stabilizer and lubricant as common in the plastics compounding art may be included. As there is constant development by the manufacturers of polymeric materials of improved or specialized formulations and as new plastics appear from time to time, it is impracticable to give chemical designations of materials which would be adaptable to my purpose, and other materials or compounds exhibiting the physical properties desired might give equal or even better results, or perhaps results not so good but acceptable. The skill of the plastics maker and a routine test under simulated practical conditions, and not requiring experiment of an inventive character, will disclose the availability of a given material for the use intended.

Referring now to the preferred embodiment of the invention shown by way of example in the drawings, and particularly to Figs. 4 and 4a, the socket member 12 and the stud member 14 herein are unitary molded elements and are in the form of solids of revolution. The male element as seen in Fig. 4a comprises a shank or post having a substantially solid enlarged head rounded marginally of its outer end and an overhanging rearward shoulder 18, which latter may be marginally slightly inclined as shown for a purpose which will appear, but which in general approximates the radial position, defining a neck beneath the head and, herein, an elevated portion 22 of greater diameter at the base of the neck. An integral peripheral flange 24 at the base of the stud provides for attaching it to the garment or other article (26 in Figs. 5 and 6) conveniently by electronic means resulting in partial fusion of the base of the flange and its anchorage to the article 26.

The socket 12 (referring to Fig. 4), likewise a solid of revolution, comprises a circumferentially continuous tube 28. At its end facing the stud it has an integral, inwardly extending overhanging flange 30 defining a central opening 32 slightly greater in diameter than the neck 20 of the stud, but smaller than head 18. The rearward surface of the flange is substantially perpendicular to the axis of the tube, forming an abrupt shoulder 34. The forward surface may be chamfered around the opening, providing a rearwardly and inwardly inclined camming surface 36 for cooperating with the rounded surfaces at the end of head 16 when the parts are engaged. An integral exterior flange 38 provides for securing the socket to the garment part, etc., 40 as seen in Figs. 5 and 6. Preferably, as shown, the flange 38 is not at the extreme end of the tube but in a plane axially rearwardly offset from, but closely adjacent the abrupt rearward shoulder 34 of flange 30, as shown, for a purpose which will appear. I also call attention here to the fact that I prefer to have the rearward end of the tube opposite the flange open as illustrated.

I might here state that Figs. 4 and 4a of the drawings illustrate in proper proportion a practical fastener in which the external diameter of the flanges 24 and 38 was seven-sixteenths of an inch. The exact dimensions and proportions are not essential, but this statement illustrates the general nature of the device we are talking about.

In Figs. 4 and 4a the parts are shown separated, but in alignment. If they are pressed together along an axial line the enlarged head 16 will enter through the hole 32 and the flange 30 come to rest in the position seen in Fig. 5 under the overhanging shoulder 18 of the head which then overlies the abrupt shoulder 34 at the rearward side of the flange. This is made possible by the cooperation of the rounded portion of the end of the head with the oblique surface 36 around the opening which sets up radial components of force permitting relative distortion of the parts, so that the head can pass the normally smaller opening. A substantially instantaneous snap action is involved and an audible snap is heard, although the sound probably results from the end of the socket fetching up against the opposed surface of the base part 22. It appears that the entry involves the elastic compressibility of the material of which the parts are made, perhaps chiefly because of that, although since the material is resiliently expansible a slight increase in diameter of the annulus formed at the location of flange 30 at the end of the socket 12 is possible and may contribute to the action. The action is analogous to, but specifically different from that of a metal press button fastener wherein the elasticity is provided by subdivision of one or both of the parts into separately yielding segments. The reverse action on separation of the parts is however not the same. On account of the abrupt shoulder 34 of the flange and the absence of markedly inclined surfaces at 18, any radial components of force set up if the parts in the position of Fig. 5 are drawn apart in the axial direction are not of practical significance. The lock is a positive lock as against axial separation except to a grossly excessive force. The flange and its supporting wall are not flabby and will not be turned inside out under the axial strains occurring in use and no substantial expanding stresses are set up.

Therefore the release action is different from that of the usual press button fastener and utilizes primarily the elastic expansibility of the material of the socket. The release may be effected by a radial strain on the socket incident ordinarily to a tipping movement, such as would be exerted on the edge of the sheet material 40, which carries the socket. The action is illustrated in Fig. 6. When the material 38 is grasped and drawn to the left and upwardly in the figure as indicated by the arrow, a radial component of force is exerted, which distorts the circular base of the socket to an elongated or elliptical shape, permitting the escape of the shoulder of flange 30 from beneath the overhanging shoulder 18 of the head and subsequent release of the head entirely from the socket. In this action the end of the socket will bear on the enlargement 22 at the opposite side of the stud, left in Fig. 6, providing a fulcrum for a tipping movement which combines the radial movement resulting in distortion and the outward movement which withdraws the flange from beneath the head. As already explained the marginal lower surface 18 of the head may be somewhat inclined and this facilitates the sliding of the corner of the abrupt shoulder past the same.

At least in the case of the preferred material described the resilient recovery from the distorted position of release is somewhat deliberate. The material does not snap back but may require a second or so to revert to its original shape. Such delay is not objectionable and may indeed be considered advantageous in facilitating disengagement.

As I have previously stated, I prefer to position the attaching flange 38 closely adjacent the plane of the flange 30 rather than at the rearward end of the socket. This permits traction to be exerted more directly on the flange 30 in the releasing action. Similarly I have stated that I prefer that the tube 28 which forms the socket be open at its rearward end so that there is no tie between the walls of the tube at this end to interfere with its intentional distortion when the parts are separated. If the sheet material 40 extends over this open end it has a fulness as indicated in Fig. 6 and is free from the walls of the socket at this end so that it does not substantially impede the desired distortion of the socket in the releasing operation.

The flange 38 is relatively thin and therefore very flexible. In the releasing action it therefore accommodates itself to the position of the sheet 40 as shown somewhat schematically in Fig. 6. The latter does not bend at the periphery of the flange but the flange bends more or less along a chord tangent to the tubular barrel 28 and tension is exerted directly on the barrel along a relatively wide zone corresponding to the chord.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A separable fastener comprising a male and a female element each being unitary and self-sufficient molded body of firm but yielding tenacious and resiliently extensible polymeric material; the male element comprising a post having a substantially solid enlarged head with a rounded end and overhanging shoulder and, at the base of the post, an integral peripheral flange providing for anchorage of the element to a supporting part; the female member comprising a circumferentially continuous tube having an exterior peripherally extending flange providing for anchorage to a flexibile sheet and having at one end an inwardly extending circumferentially continuous overhanging flange the rearward surface of which is disposed substantially perpendicular to the axis of the tube to provide an abrupt shoulder, the opening within the latter flange corresponding substantially to the cross sectional area of the post beneath the head, whereby on axial approximation of the parts and their resultant elastic deformation when pressed together the head may pass the flange and the abrupt shoulder of the flange move beneath the overhanging shoulder of the head effectively to resist axial withdrawal of the head, the tube being elastically distortable in shape under radially applied strain to withdraw a portion of the flange radially beyond the head and permit separation of the element by a tipping movement following the distortion.

2. A separable fastener as set forth in claim 1 wherein the exterior flange of the tube is between its ends and closely adjacent the plane of the abrupt shoulder whereby traction on the sheet exerts a distorting force on the flange closely adjacent said shoulder.

3. A separable fastener as set forth in claim 1 wherein the post has remote from its overhanging shoulder an elevated portion closely opposing the end of the tube when the parts are engaged to provide a fulcrum for the tipping movement.

4. A separable fastener as set forth in claim 1 wherein the tube is open at both ends.

5. A socket for a separable snap fastener comprising a unitary and self-sufficient body of firm but yielding tenacious and resiliently extensible polymeric material in the form of a solid of revolution and including a circumferentially continuous cylindrical wall having at one end an inwardly extending circumferentially continuous overhanging flange defining a central opening, the flange presenting a forwardly facing rearwardly and inwardly inclined surface, and a rearwardly facing surface which is substantially perpendicular to the axis of the tube to provide an abrupt shoulder behind which an overhanging, rearwardly facing shoulder of the head of a cooperating male fastener may engage after the head has been forced through the opening defined by the flange and means for securing the cylinder to a supporting part said means being integral with the cylinder and at a location axially inwardly offset from the plane of the flange to permit substantially unimpeded elastic deformation of the forward end of the cylinder and the flange under radially exerted strains to withdraw the flange at one side from beneath said shoulder of the head.

References Cited in the file of this patent

UNITED STATES PATENTS

| | | |
|---|---|---|
| 665,901 | Hampton | Jan. 15, 1901 |
| 2,144,755 | Freedman | Jan. 24, 1939 |
| 2,368,100 | Boenecke | Jan. 30, 1945 |
| 2,538,396 | Sutin | Jan. 16, 1951 |
| 2,709,290 | Rosenthal | May 31, 1955 |
| 2,724,884 | Jones | Nov. 29, 1955 |
| 2,745,159 | Jones | May 15, 1956 |

FOREIGN PATENTS

| | | |
|---|---|---|
| 57,548 | France | Nov. 5, 1952 |
| | (1st addition to No. 1,008,609) | |
| 621,404 | Great Britain | Apr. 8, 1949 |
| 625,357 | Great Britain | Jan. 27, 1949 |